Sept. 20, 1966  E. H. PUTLEY  3,274,387
INFRARED DETECTOR COMPRISING A COOLED SEMI-CONDUCTOR
DISPOSED IN A MAGNETIC FIELD
Filed Aug. 21, 1961  3 Sheets-Sheet 1

United States Patent Office 3,274,387
Patented Sept. 20, 1966

3,274,387
INFRARED DETECTOR COMPRISING A COOLED SEMI-CONDUCTOR DISPOSED IN A MAGNETIC FIELD
Ernest Henry Putley, Malvern, England, assignor to National Research Development Corporation, London, England
Filed Aug. 21, 1961, Ser. No. 132,913
Claims priority, application Great Britain, Aug. 22, 1960, 28,946/60
15 Claims. (Cl. 250—83.3)

This invention relates to photoconductive radiation detectors and has reference to detectors for radiation in the waveband 0.1 to 8 mm.

A photoconductive detector which is sensitive in this waveband finds use in several ways, for example in the measurement of temperatures encountered in plasma effect studies.

The invention is based on the interesting property of a very pure semiconductor material such as indium antimonide with impurities about $10^{14}$ cm.$^{-3}$ for example that, at practical magnetic field strengths and achievable low temperatures, its ionisation energy is sufficiently high for impurity photoconductivity to take place for incident radiation in the 0.1 to 8 mm. waveband.

This invention therefore provides a photoconductive cell for detecting radiation in the waveband 0.1 to 8 mm. comprising, in combination, a mass of very pure semiconductor material having conducting leads connected thereto, means for establishing a magnetic field through the mass transversely to a current path defined in the material by the conducting leads, means for cooling the semiconductor mass, and radiation transmitting means for transmitting radiation from at least part of the waveband 0.1 to 8 mm. to a region of the current path in the mass traversed by the magnetic field.

Figure 1:
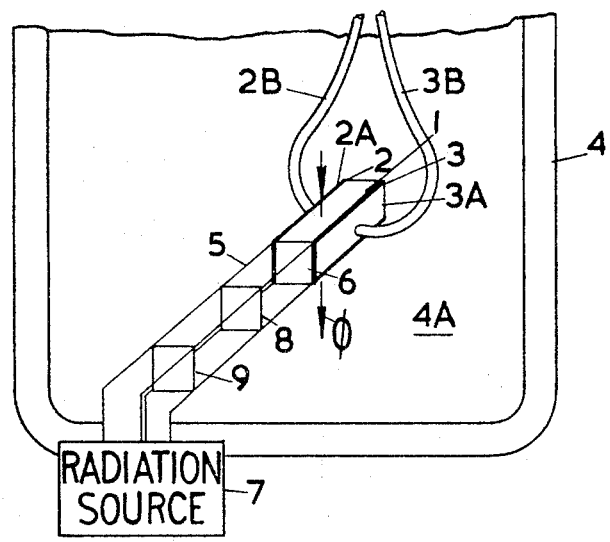
Figure 2:
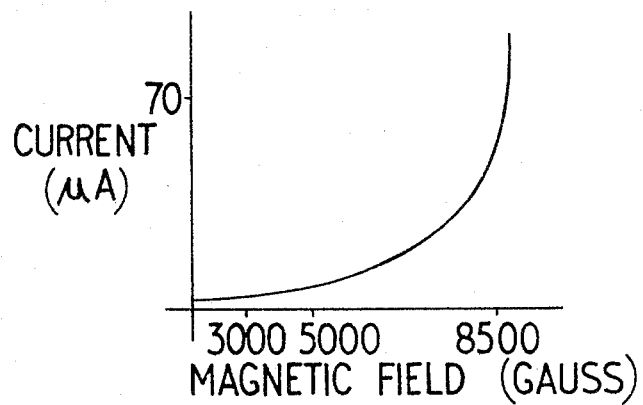

The property upon which the invention is based will now be discussed further and an example of a cell by way of an early model to demonstrate the invention will be described with reference to the accompanying drawings in which:

FIG. 1 shows schematically the arrangement of a cell according to the invention and, FIG. 2 shows a graph which shows the relationship between photoconductive current and applied magnetic field for a typical development cell.

Figure 3:
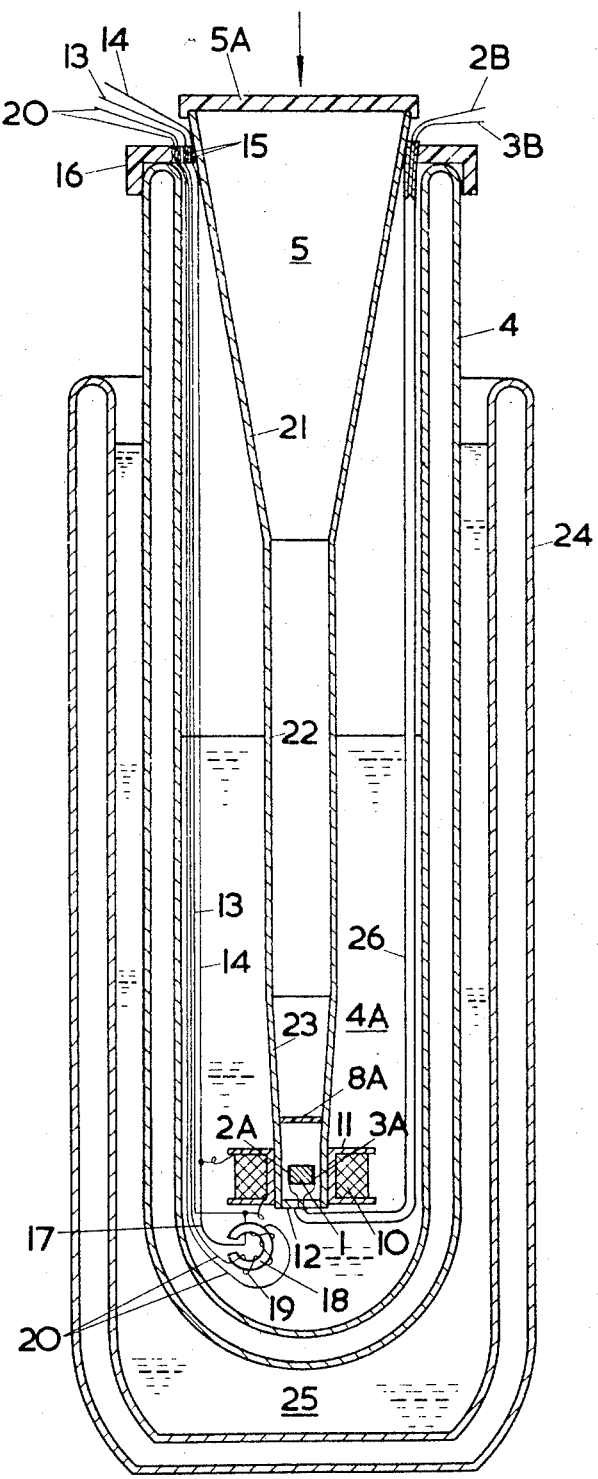
Figure 4:
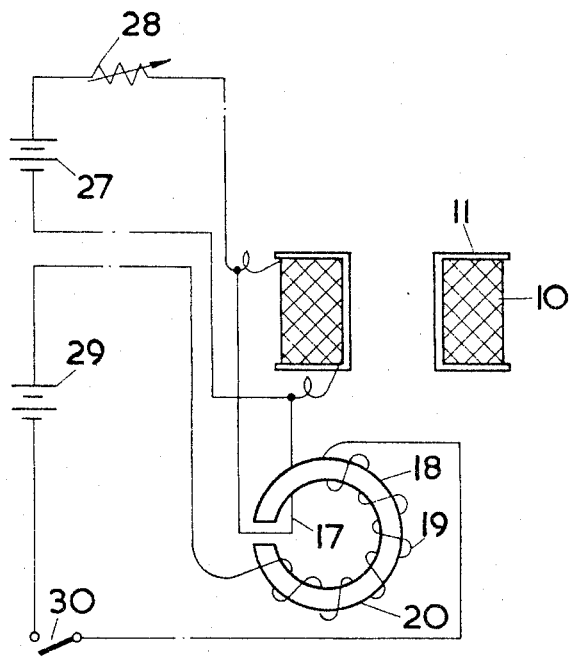

An example of a more developed model will also be described with reference to the following figures of the accompanying drawings:

FIG. 3 which shows a developed model of a cell according to the invention and,

FIG. 4 which shows a detail of the model of FIG. 3.

Indium antimonide of N type conductivity having an impurity concentration of about $10^{14}$ cm.$^{-3}$ can be obtained using the methods described by Hulme and Mullin (Great Britain Patent Application No. 40398/57 now Great Britain Patent No. 853,975) and measurements of Hall effect for typical samples show that for low magnetic fields there is no detectable ionisation energy but as the magnetic field is increased the carrier concentration falls as the temperature is lowered to 1.8° K. The electron concentrations above 1.8° K. are sufficiently small for classical statistics to be valid. Thus if the effect of the magnetic field on the conduction band is taken into account the relation between the carrier concentration ($n$) the concentration of donors ($N_D$) and acceptors ($N_A$) and the donor ionisation energy $\epsilon$ becomes:

$$\frac{(N_A+n)n}{N_D-N_A+n} = (2m^*kT)^{\frac{1}{2}}\frac{eB}{h^2}\,\text{ex}\,\frac{-\epsilon}{kT}$$

Wherein:

$m^*$ denotes effective electron mass
$k$ denotes Boltzmann's constant
$T$ denotes absolute temperature, ° K.
$e$ denotes electron charge
$B$ denotes magnetic induction, and
$h$ denotes Planck's constant.

Application of this expression to the results of Hall effect measurements yields the following values for the donor concentrations ($N_D cm^3$) and ionization energies ($\epsilon eV$):

| Crystal Number | C158/84 | | M1 | | HC27/149 | |
|---|---|---|---|---|---|---|
| Net Impurity Concentration $N_D-N_A$cm.$^{-3}$ | $4.9 \times 10^{13}$ | | $4.2 \times 10^{13}$ | | $4.16 \times 10^{13}$ | |
| $\epsilon eV$, $N_D cm.^3$ for following values of B gauss: | $(\times 10^{-4})$ | $N_D$ $(\times 10^{14})$ | $(\times 10^{-4})$ | $N_D$ $(\times 10^{14})$ | $(\times 10^{-4})$ | $N_D$ $(\times 10^{14})$ |
| 8230 | 7.5 | 4.3 | 7.1 | 2.8 | 7.6 | 3.1 |
| 7125 | 6.2 | 4.4 | 5.8 | 3.1 | 6.6 | 3.1 |
| 6142 | 5.1 | 4.5 | 4.8 | 2.9 | 5.4 | 2.7 |
| 4417 | 2.7 | 3.9 | 2.5 | 2.6 | 3.3 | 2.8 |

The values obtained for the ionization energies indicate that impurity photoconductivity should be observed if this material is illuminated with radiation of up to a few mm. wavelengths and that the values of the magnetic fields required would not be so high as to make the application of this effect impracticable.

The essentials of a simple cell are shown in FIG. 1 of the drawings. A mass 1 of N type indium antimonide of impurity concentration about $10^{14}$ cm.$^{-3}$ is subjected to a magnetic field shown conveniently by the flux vector $\phi$ and possesses indium electrodes 2A, 3A, to which connections 2B, 3B are made, applied to opposing faces 2, 3 of the mass 1. The size of the mass 1 is 0.5 x 0.5 x 1.0 cm., the faces 2A, 3A being 0.5 x 1.0 cm.

The mass 1 is contained in a cryostat 4 of liquid helium 4A and a radiation pipe 5 leads inwards to a face 6 (0.5 x 0.5) of the mass 1 from a radiation source 7. The pipe 5 is fitted with a black polythene filter 8 at a point along it but within the cryostat 4 and a black paper filter 9 at a point in the pipe 5 outside the cryostat 4. Details of the cryostat and of the way the connections are brought in are omitted in the interests of simplicity and brevity. Thus, in operation, the magnetic field is applied at right angles to the directions of current flow between the electrodes 2, 3 and of incident radiation from the pipe 5. The incident radiation is shown as coming from the generally designated source 7; for wavelengths in the range 0.1 to 1.4 mm. the source 7 is a mercury lamp and grating spectrometer combination and for other longer wavelengths a klystron is used (typically for 2 and 4 mm. a Phillips DX 151 klystron with a harmonic generator). The two filters 8 and 9 remove unwanted short wave radiation.

Conveniently the radiation source 7 includes a modulator operated at 800 c./s. for example and the electrodes 2 and 3 are connected to a current source and coupled with a tuned amplifier and phase sensitive detector.

When the temperature is reduced to below 1.5° K. and the magnetic field is applied, the resistance of the mass 1 is about 10–30 K$\Omega$ between the electrodes 2, 3. The mass 1 detects the applied radiation, the minimum detectable energy per unit bandwidth being approximately $5 \times 10^{-10}$ w. at 0.5 mm., $5 \times 10^{-11}$ w. at 2 mm. and $10^{-10}$ w. at 4 mm. In the example described the performance is an optimum for a magnetic field of 6,000 gauss and a current of 30 $\mu$A.

FIGURE 2 illustrates the relationship between the signal current due to incident radiation and the induced field. The effect is almost negligible for inductions less than 3000 gauss but it rises rapidly as the induction is increased over 4000 gauss. It can also be deduced from the results that for the higher values of magnetic induction the effect at first increases linearly as the current is increased but at higher currents the effect passes through a maximum; it also appears that there is an optimum value for the magnetic induction of about 6000 gauss. This behaviour is thought to be associated with non-ohmic effects in high electric and magnetic fields which have been observed in single specimens of the indium antimonide material similar to the one used here for the cell.

When the modulation frequency of the radiation is varied between 16 c./s. and 1000 c./s. the performance of the cell proves to be independent of frequency. This, together with the size of the mass 1 and the fact that it was directly immersed in liquid helium suggests that these results are unlikely to include any bolometric effects.

These results are by way of example and probably do not represent the ultimate performance obtainable; the sensitivity was limited by amplifier noise and the purity and size of the mass 1 were not necessarily optimum values.

A further developed model of a cell for detecting radiation between 0.1 and 8 mm. is shown in FIG. 3. Parts corresponding to similar parts of the cell of FIG. 1 are designated similarly.

The detector element of the cell consists of a plate 1 cut from single crystal indium antimonide about 0.5 x 0.5 cm. area by 0.2 cm. thick. The material used is N type and has a free electron concentration (as determined by Hall effect measurements at 77° K.) of $5 \times 10^{13}$ cm.$^{-3}$ and a mobility not less than $5 \times 10^5$ cm.$^2$ volt$^{-1}$ sec.$^{-1}$. The area of the specimen is chosen to represent a practical compromise between the requirement of a small area to reduce noise fluctuations and the requirement of making the area sufficiently large to be able to effectively focus the incoming radiation upon it. The thickness is chosen to be as small as possible consistent with complete absorption of the incident radiation.

A coil 10 of niobium wire wound on a copper spool 11 constitutes a superconducting magnet and also provides a container for the indium antimonide plate 1. The spool 11 is closed at one end by a plate of copper 12 and leads 13, 14 provide connections to the coil 10 through seals 15 in the vacuum-tight cover 16 of the liquid helium cryostat 4.

The internal diameter of the coil 10 is about 0.8 cm. and the external diameter about 2.0 cm. and contains 40,000 turns of 0.005″ diameter wire.

An auxiliary loop 17 of niobium wire is connected in parallel with the coil 10 and passes through the gap of an iron ring 18. A winding 19 on the ring 18 is connected to the outside of the cryostat 4 for control purposes by leads 20.

Incident radiation is directed onto the detector plate 1 by means of a tapered tube or light-pipe 5. The aperture of the pipe 5 is closed by a polythene vacuum cover 5A and may be 2 cm. diameter or more. The best configuration for the light-pipe would be a smoothly tapering tube which could be fabricated by electroforming from copper. This would not be suitable for this apparatus because it is essential that the thermal conductance of the part of the tube along which the temperature falls from room temperature to 1.5° K. be as small as possible. These requirements are attained by making the light-pipe 5 in three sections 21, 22, 23. The first, 21, which is wholly at room temperature consists of an electroformed copper tube 20 cm. long and tapering from 2.0 to 1 cm. inside diameter. The second section 22 consists of a thin walled cupro-nickel tube 1 cm. diameter and about 20 cm. long. All the temperature gradient occurs along this section 22; the third section 23 consists of an electroformed copper tapered copper tube 20 cm. long reducing to 0.3 cm. diameter. The light pipe 5 is closed with a black paper or black polythene filter 8A which absorbs room temperature radiation at wavelength less than 0.1 mm. The inner cryostat 4 is about 2¼″ inside diameter and 22″ long. This holds a charge of about 1½ litres of liquid helium (for eight hours operation) and is in turn held in an outer cryostat 24 and cooled by liquid nitrogen 25.

In operation the plate 1 is held at 1.5° K. owing to the liquid helium and current of about 2.4 amp. is fed to the coil 10 (via the leads 13, 14) which assumes a superconducting state and establishes a field of up to 8000 gauss through the plate 1. For an optimum field of 6000 gauss the resistance of the plate 1 is between 20 Kohm and 50 Kohm dependent upon the incident radiation reaching the plate 1 along the light pipe 5 in the direction of the arrow.

Before the superconducting current is established in the coil 10 a current is applied via the leads 20 to the winding 19 of the iron ring 18 which inhibits the superconducting state in the auxiliary niobium wire loop 17, thus providing a superconducting switch. When the superconducting current is established the current in the winding 19 is switched off and the loop 17 becomes superconducting; henceforth therefore the current fed into the leads 13–14 for the coil 10 may also be switched off—it is not required to maintain the magnetic field which consequently requires no power for its maintenance.

Circuit access to the plate 1 is obtained of course via the leads 2B, 3B which are spaced and lead through a screening sheath 26 sealed into the vacuum-tight cover 16.

Typical performance figures which have been achieved with this apparatus are as follows:

| Operating conditions | (1) | (2) | |
|---|---|---|---|
| Wavelength, mm | 0.2 | 0.5 | 1.0 |
| Responsivity, V./W | 200 | 500 | 1,000 |
| Minimum energy signal in 1 c./s. bandwidth (joules) | $5 \times 10^{-11}$ | $2 \times 10^{-11}$ | $1 \times 10^{-11}$ |

[1] 1.5° K.
[2] 6,000 gauss.

The time-constant of the photoconducting process is less than 1 $\mu$sec. Since the resistance of the detector is less than 100 Kohm the RC time constant of the input circuit may also be kept below 1 $\mu$sec. Hence the arrangement is suitable for observing very short pulses of radiation from shock tubes or thermo-nuclear generators.

A more detailed schematic drawing of the arrangement of the superconducting coil 10 and its auxiliary circuit is shown in FIG. 4 where a battery 27 feeds the coil 10 through a rheostat 28 and the winding 19 on the iron ring 20 is controlled by and energised from a battery 29 under the control of a switch 30. The broken lines indicate that the batteries 27 and 29, the rheostat 28 and the switch 30 are outside the cryostats 4 and 24 and hence are at room temperature.

With regard to the material used in one typical example having an excess electron concentration of about $5 \times 10^{13}$ cm.$^{-3}$ (determined by Hall effect measurements at 77° K.), the electron mobility is greater than $5 \times 10^5$ cm.$^2$ volt$^{-1}$ cm.$^{-1}$ at 77° K. and at 4.2° K. between $5 \times 10^4$ and $10^5$. From these measurements the total impurity concentration is found to be about $5 \times 10^{14}$ cm.$^{-3}$. This value is somewhat higher than might be expected but is not inconsistent with the comparatively low mobility at 4.2° K.

The best results appeared to be obtained at 1.5° K. but the temperature is not critical; good results were obtained at 1.1° K. and 2° K. The optimum magnetic induction depends upon temperature, falling as the temperature is reduced.

The maximum responsivity depends upon the wavelength at different magnetic inductions and for the higher values of the induction the responsivity increases linearly with wavelength up to about 1 mm. At longer wavelengths the responsivity falls slightly. At zero induction and at 2000 gauss the responsivity increases at approximately the square of the wavelength up to 1 mm. and again falls off at longer wavelengths.

What I claim is:

1. A photoconductive cell for detecting radiation in the waveband 0.1 to 8 mm. comprising, in combination, a mass of very pure semiconductor material having conduction leads connected thereto to establish a current path through said material, means for establishing a magnetic field of at least 2000 gauss through the mass at least substantially normal to said current path defined in the material by the conduction leads, means for cooling the semiconductor mass, and radiation transmitting means for transmitting radiation from at least part of the waveband 0.1 to 8 mm. to a region of the current path in the mass traversed by the magnetic field.

2. A photoconductive cell as claimed in claim 1, wherein the means for establishing the magnetic field comprises a superconducting electromagnet.

3. A photoconductive cell as claimed in claim 1, wherein the radiation transmitting means comprises a conductively walled pipe tapering generally from a wider aperture for incident radiations to an incident surface of the mass of semiconductor material.

4. A photoconductive cell as claimed in claim 1, wherein the means for cooling the semiconductor mass comprises an open-ended cryostat and the radiation transmitting means is a radiation guide giving access to the semiconductor mass by means of the open end of the cryostat.

5. A photoconductive cell as claimed in claim 1, wherein means are provided for adjusting the strength of the magnetic field.

6. A photoconductive cell as claimed in claim 1, wherein the semiconductor material is indium antimonide.

7. A photoconductive cell as claimed in claim 1 wherein the means for establishing a magnetic field comprise means for establishing a magnetic field of at least 1000 gauss through the mass at least substantially normal to said current path defined in the material by the conduction leads.

8. A photoconductive cell as claimed in claim 2, wherein the superconducting electromagnet comprises a superconducting coil in parallel with a superconducting switch.

9. A photoconductive cell as claimed in claim 3, wherein the tapering pipe comprises at least one section intermediate its ends of higher thermal resistance than its end sections.

10. A photoconductive cell as claimed in claim 3, wherein the radiation transmitting means includes a polythene filter.

11. A photoconductive cell as claimed in claim 3, wherein the radiation transmitting means includes a black paper filter.

12. A photoconductive cell as claimed in claim 3, wherein means are provided for adjusting the strength of the magnetic field.

13. A photoconductive cell as claimed in claim 3, wherein the semiconductor material is indium antimonide.

14. A photoconductive cell as claimed in claim 9, wherein the means for establishing the magnetic field comprises a coil wound on a conductive former, which constitutes a container for the mass of semiconductor material and from which the conductively walled pipe extends.

15. A photoconductive cell as claimed in claim 14, wherein the means for cooling the semiconductor mass comprises an open-ended cryostat and the radiation transmitting means is a radiation guide giving access to the semiconductor mass by means of the open end of the cryostat.

References Cited by the Examiner

UNITED STATES PATENTS

| | | | |
|---|---|---|---|
| 2,816,232 | 12/1957 | Bursteein | 250—83.3 |
| 2,932,743 | 4/1960 | Atwood | 250—83.3 |
| 3,077,538 | 2/1962 | Franzen | 250—83.3 |

OTHER REFERENCES

Impact Ionization Devices by Steele, 1958, RCA TN No. 172, Published by Radio Corporation of America, RCA Laboratories, Princeton, N.J.

RALPH G. NILSON, *Primary Examiner.*

ARTHUR GAUSS, JAMES W. LAWRENCE,
*Examiners.*

RICHARD F. POLISSACK, *Assistant Examiner.*